(12) United States Patent
Kuo (10) Patent No.: US 9,736,073 B2
(45) Date of Patent: Aug. 15, 2017

(54) PACKET SWITCH DEVICE AND METHOD OF THE SAME

(71) Applicant: ACCTON TECHNOLOGY CORPORATION, Hsinchu (TW)

(72) Inventor: Hui-Chen Kuo, Tainan (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 325 days.

(21) Appl. No.: 14/185,940

(22) Filed: Feb. 21, 2014

(65) Prior Publication Data

US 2014/0341030 A1 Nov. 20, 2014

(30) Foreign Application Priority Data

May 17, 2013 (TW) .............................. 102117576 A (51) Int. Cl.
| | |
|---|---|
| *H04L 12/803* | (2013.01) |
| *H04L 12/931* | (2013.01) |
| *H04L 29/06* | (2006.01) |
| *H04L 12/741* | (2013.01) |
| *H04L 12/721* | (2013.01) |

(52) U.S. Cl.
CPC ............ *H04L 47/122* (2013.01); *H04L 49/35* (2013.01); *H04L 45/38* (2013.01); *H04L 45/54* (2013.01); *H04L 69/22* (2013.01)

(58) Field of Classification Search
CPC ....... H04L 49/35; H04L 45/38; H04L 12/467; H04L 47/2441; H04L 47/10; H04L 49/3009; H04L 49/309; H04L 45/54; H04L 12/4645; H04L 12/56; H04L 47/122; H04L 47/2483; H04L 45/72; H04L 45/745; H04L 45/74; H04L 69/22
See application file for complete search history.

(56) References Cited

U.S. PATENT DOCUMENTS 6,636,501 B1 * 10/2003 Dispensa ................ H04L 49/25
370/351
7,460,534 B1 * 12/2008 Bellenger ............. H04L 45/745
370/392

(Continued)

OTHER PUBLICATIONS open Networking Foundation, "OpenFlow Switch Specification", Version 1.3.0 (Wire Protocol 0x04), Jun. 25, 2012.

*Primary Examiner* — Candal Elpenord
*Assistant Examiner* — Ricardo Castaneyra
(74) *Attorney, Agent, or Firm* — CKC & Partners Co., Ltd.

(57) ABSTRACT

A packet switch device includes an input port, a loop-back port, a storage module, and a switch engine. The input port receives a packet. The storage module stores packet flow tables. Each packet flow table includes at least one flow entry and action. The switch engine compares the packet with a default packet flow table of the plurality of packet flow tables when it determines that the packet does not include a flow header. The switch engine includes the packet with the flow entry of the default packet flow table and performs the corresponding action when the packet matches the flow entry. When the action includes a specific action of comparing the packet with another one of the packet flow tables, the switch engine attaches the flow header to the packet to set a flow ID therein and transmits the packet back to the switch engine through the loop-back port.

10 Claims, 4 Drawing Sheets

(56) References Cited

U.S. PATENT DOCUMENTS

| | | | |
|---|---|---|---|
| 2011/0320632 A1* | 12/2011 | Karino | H04L 45/586 709/238 |
| 2013/0010600 A1 | 1/2013 | Jocha et al. | |
| 2013/0163427 A1* | 6/2013 | Beliveau | H04L 67/327 370/235 |
| 2013/0230047 A1* | 9/2013 | Subrahmaniam | H04L 47/2441 370/392 |

* cited by examiner

| Flow ID | Flow entry | Transmit to the loop-back port | Corresponding Instruction |
|---|---|---|---|
| 0 | Flow header not included | Yes | Modify Dst IP and set flow ID to 1 |
| 1 | VLAN-ID:1 | Yes | Set flow ID to 2 and modify VLAN-ID |
| 2 | IP:10.1.0.1 | Yes | Set flow ID to 3 and modify CoS |
| 3 | DSCP:63 | No | Modify DSCP and transmit packet to external network device |

PACKET SWITCH DEVICE AND METHOD OF THE SAME

RELATED APPLICATIONS

This application claims priority to Taiwan Application Serial Number 102117576, filed May 17, 2013, which is herein incorporated by reference.

BACKGROUND

Field of Invention

The present invention relates to packet switch technology. More particularly, the present invention relates to a device and a method for packet switching.

Description of Related Art

With the increasing complexity of network environments, traditional network switches and routers have more and more functions, but lead to low network transmission efficiency. In addition, with the limitations encountered due to the operating system of network hardware equipment, administrators are not allowed to freely manage the transmission paths of the network packets based on requirements. In response, Stanford University of the United States started to promote an experimental technology referred to as "OpenFlow" in 2008 with the expectation that the architecture of open network management would improve network efficiency and satisfy the demand for flexible applications so as to ultimately provide more accurate network management abilities to network service providers.

OpenFlow technology separates the functions of network path control and data packet transmission that are both performed by network switches or routers formerly. The function of network path control is executed by an additional external controller installed with OpenFlow control software. The controller controls the OpenFlow switch by managing a flow table. The flow table includes a group of flow entries, and the flow entries further include match fields, counter and a group of instructions. The OpenFlow switch performs the function of data packet transmission according to a rule in which when a packet matches the match fields of a flow entry, and a specific action of the instructions corresponding to the flow entry is performed.

However, according to the current hardware architecture, a typical OpenFlow switch only supports packet matching of single flow table rather than of multiple flow tables. In other words, each of the packets can only be compared with one flow table. The corresponding instruction or action cannot direct the packet to be compared with other flow tables. Since the conventional hardware architecture does not support the new technology of OpenFlow which supports multiple flow tables, extra costs are required to re-design the architecture so as to conform to the new technology standards.

Therefore, an important area in the field requiring attention is that related designing a new device and method for packet switching that conform to the current standards so as to resolve the above-mentioned problems.

SUMMARY

A packet switch device is provided. The packet switch device comprises an input port, a loop-back port, a storage module, and a switch engine. The input port receives a packet. The storage module stores a plurality of flow tables. Each of the flow tables includes at least one flow entry with at least one instruction. The switch engine determines whether the packet includes a flow header. The switch engine compares the packet with a default flow table of the plurality of flow tables when the packet does not include a flow header. The switch engine compares the packet with the flow entry of the default flow table and performs the corresponding instruction when the packet matches the flow entry. When the instruction includes a specific action of comparing the packet with another one of the flow tables, the switch engine attaches and edits the flow header to the packet to set a flow ID in the flow header and transmits the packet back to the switch engine through the loop-back port.

In the foregoing, if the packet includes a flow header, the switch engine retrieves a corresponding flow table according to the flow ID in the flow header from the plurality of flow tables to match with the packet, compares the packet with the flow entry of the corresponding flow table, and performs the corresponding instruction when the packet matches the flow entry. When the instruction includes the specific action of comparing the packet with another flow table, the switch engine modifies the flow ID correspondingly and transmits the packet back to the switch engine through the loop-back port. A value of the modified flow ID is greater than a value of the flow ID prior to modification.

Moreover, the storage module is a ternary content addressable memory.

In the foregoing, the packet switch device further includes an output port. When the packet does not match the flow entry of the default flow table or the corresponding flow table, the switch engine either directly compares the packet with the flow table next to the current flow table, drops the packet, or forwards the packet to the external Open Flow controller through the output port.

In the foregoing, the flow entry comprises match fields including at least one piece of internal information or at least one piece of external information of the packet. The internal information includes an Internet Protocol (IP) address, a virtual local area network (VLAN) identifier, a class of service (CoS), a differentiated services code point (DSCP), or a combination thereof. The external information includes a packet source, a port number of the input port, or a combination thereof.

The invention provides a method for packet switching applied to a packet switch device. The method includes the steps of: determining whether a packet includes a flow header by a switch engine, wherein the switch engine compares the packet with a default flow table if the packet does not include the flow header, wherein each of the plurality of flow tables includes at least one flow entry comprising at least one instruction; comparing the packet with the flow entry of the default flow table by the switch engine, and performing the corresponding instruction when the packet matches the flow entry; and recording the flow header to the packet to set a flow ID in the flow header and transmitting the packet back to the switch engine through a loop-back port by the switch engine when the instruction includes a specific action of comparing the packet with another one of the flow tables.

In the foregoing, the method further includes: retrieving a corresponding flow table according to the flow ID in the flow header from the plurality of flow tables to perform a comparison with the packet by the switch engine if the packet includes the flow header; and comparing the packet with the flow entry of the corresponding flow table and performing the corresponding instruction when the packet matching the flow entry, wherein when the instruction includes the specific action of comparing the packet with another one of the flow tables, the switch engine modifies the flow ID correspondingly and transmits the packet back to the switch engine through the loop-back port, wherein a value of the modified flow ID is greater than a value of the flow ID prior to modification.

In the foregoing, the method further includes updating the plurality of flow tables by an external OpenFlow controller.

The invention further provides a method for packet switching applied to a packet switch device. The method includes the steps of: determining whether a packet includes a flow header by a switch engine, the switch engine recording a flow header to the packet to set a flow ID if the packet does not include the flow header; retrieving a corresponding flow table according to the flow ID from the plurality of flow tables to perform a comparison with the packet by the switching engine, wherein each of the plurality of flow tables comprises at least one flow entry that contains at least one instruction; comparing the packet with the flow entry of the corresponding flow table by the switch engine, and performing the corresponding instruction when the packet matches the flow entry; and modifying the flow ID correspondingly and transmitting the packet back to the switch engine through a loop-back port by the switch engine when the instruction includes a specific action of comparing the packet with another one of the flow tables, wherein a value of the modified flow ID is greater than a value of the flow ID prior to modification.

In the foregoing, the method further includes directly comparing the packet with the flow table next to the current flow table, dropping the packet; or transmitting the packet outward to the controller through an output port by the switch engine when the packet does not match the flow entry of the current flow table.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
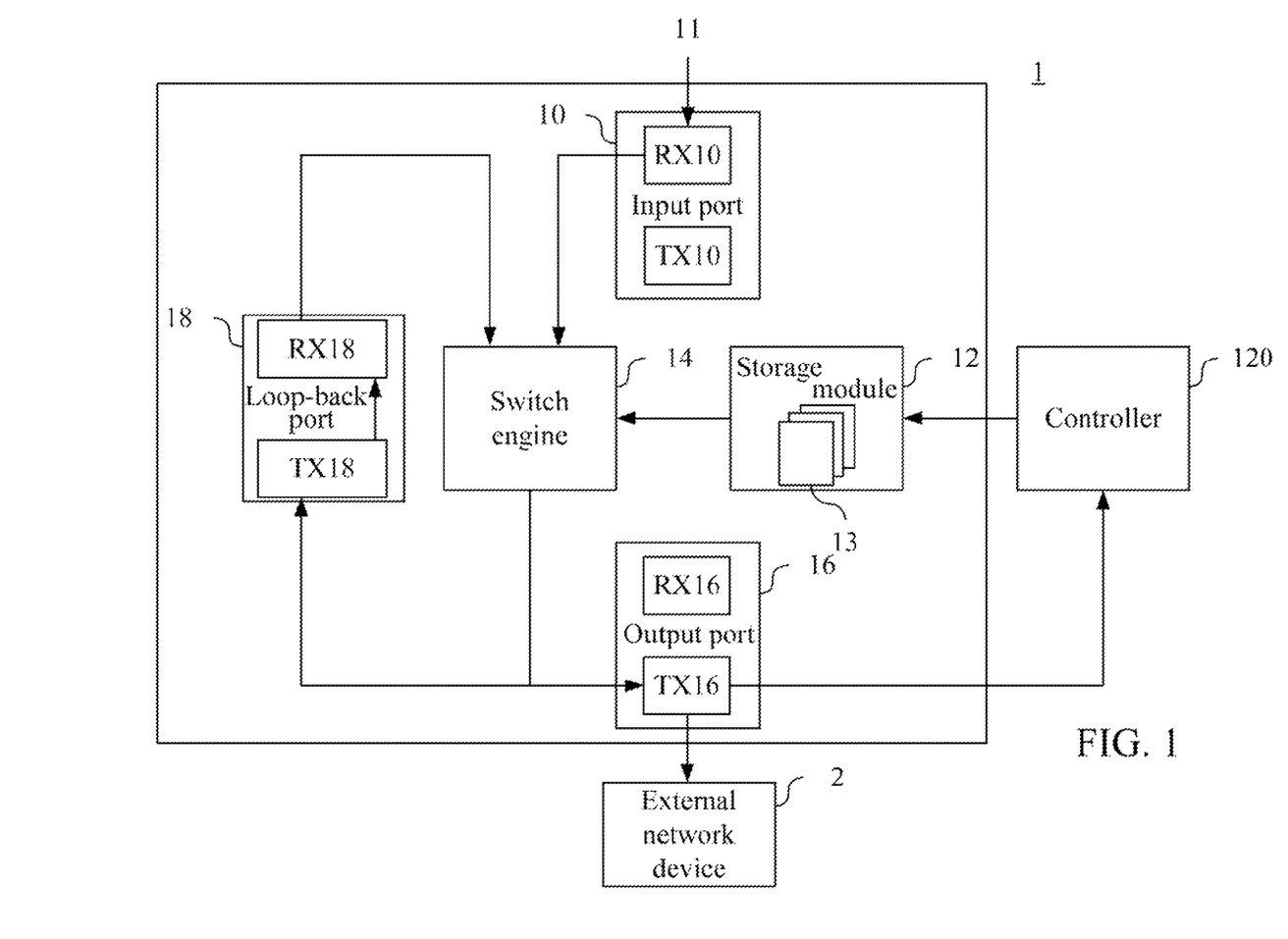
FIG. 1 is a block diagram of a packet switch device according to an embodiment of the invention.

FIG. 1 is a block diagram of a packet switch device 1 according to an embodiment of the invention. The packet switch device 1 includes an input port 10, a storage module 12, a switch engine 14, an output port 16, and a loop-back port 18.

The input port 10, the loop-back port 18, and the output port 16 respectively include receiving units RX16, RX18, RX16 and transmission units TX10, TX18, TX16. The input port 10 receives a packet 11 by the receiving unit. RX10.

The storage module 12 stores a plurality of flow tables 13. In an embodiment, the storage module 12 is a ternary content addressable memory (TCAM), and the flow table 13 is a ternary content addressable memory rule table. It is worth noting that the ternary content addressable memory is able to define three different states or rules including a "don't care" state together with the traditional "1" bit state and "0" bit state that respectively represent "match" and "not match" to gain flexibilities of the criteria when the comparison is performed. The flow table 13 includes at least one flow entry and at least one corresponding instruction. In an embodiment, if all rules of the flow entries are assigned as "don't care", the corresponding instructions are performed no matter what the contents of the packets include. In other words, it is so-called "match any" condition.

According to the Open Flow specification, each of the flow entries in the flow table 13 supports the three parts of contents which are the match fields, the instructions including actions and the counter indicating the state. The flow entries may be simply classified into the flow entries determined based on internal packet information and the flow entries determined based on external packet information.

For example, the internal information of the packet may include, but is not limited to including, an Internet Protocol (IP) address, an Internet Protocol type (IP type), a virtual local area network (VLAN) identifier, a class of service (CoS), a differentiated services code point (DSCP), even the information of whether a packet header is included, the contents of a flow header, or a combination thereof.

The external information of the packet also may include, but is not limited to including, a packet source, a port number of the input port, or a combination thereof. However, the external packet information in the present invention is not limited to such information. Other common network settings and information, such as an Ether type, a source media access control (Src MAC) address, a source IP (Sic IP), a destination IP (Dst IP), a L4 source port, or a L4 destination port may be included in the criteria for comparison.

Due to the characteristic of the ternary content addressable memory mentioned above, the comparison can be performed with multiple combinations of criteria set simultaneously in the present invention. Certain criteria must be matched and are set to be in the state of bit 1. Certain criteria must be unmatched and are set to be in the state of bit 0. Certain criteria are ignored and are set to be in the state of don't care. As a result, various settings of the flow entries in the flow table 13 of the present invention are allowed to be set in a flexible manner.

The corresponding instructions are the actions that the switch engine 14 performs accordingly when the packet 11 matches at least one flow entry. A detailed description of the flow table 13 is provided in the following paragraphs.

In an embodiment, the flow table 13 is managed and updated by an external controller 120 in an embodiment, the packet switch device 1 is connected to the external controller 120 through an OpenFlow channel (not shown). The packet switch device 1 communicates with the external controller 120 through the OpenFlow channel and the external controller 120 manages packet switch device 1 via the OpenFlow protocol. It is worth noting that any device that is equipped with an Internet communication interface and supports the OpenFlow standard can serve as the controller 120. The simplest example is a personal computer (PC) or a network server. However, the controller 120 in the present invention is not limited such devices.

First, the switch engine 14 determines whether the packet 11 includes a flow header. If the packet 11 does not include a flow header, the switch engine 14 determines that the packet 11 is received for the first time. In an embodiment, the switch engine 14 directly retrieves a default flow table from the storage module 12 to perform a comparison to ascertain if the packet 11 does not include a flow header and determines whether the packet 11 matches at least one flow entry in the default flow table. In the current OpenFlow specification, multiple flow tables are sequentially numbered from zero. The flow table numbered 0 is usually assigned as the default flow table for the packet that does not include a flow header. However, the selected flow table for comparing with the packet without flow header in the present invention is not limited to such an example. When the packet 11 matches at least one of the flow entries, the switch engine 14 processes the packet 11 based on the corresponding instruction(s). The instruction may include a single action or a multiple of actions. For example, the content of the packet 11 may be modified first and the packet 11 is further forwarded to other external devices.

The switch engine 14 in the present invention is a common network communication device, such as a packet processing module or unit in a switch or a router that is able to transmit, receive, compare, and edit a packet. Therefore, the switch engine 14 can be a network processor, a chip set, or a micro-controller in a switch or a router. However, the switch engine of the present invention is not limited to such devices.

In an embodiment, the switch engine 14 determines whether to set a flow ID for the packet 11 according to whether the instruction includes a specific action of comparing the packet 11 with another flow table. The setting of the flow ID allows the packet 11 to be compared with the other flow table corresponding to the flow ID in the next stage of comparison. According to the current OpenFlow specification, multiple flow tables are numbered sequentially from zero. Hence, if the switch engine 14 determines that one of the instructions includes the specific action of comparing the packet 11 with another flow table, the switch engine 14 records the flow header in the packet 11 and sets an assigned value as the flow ID in the flow header corresponding to another flow table that is going to be compared subsequently.

Further, the switch engine 14 transmits the packet 11 back to the switch engine 14 through the loop-back port 18 to perform the next stage of packet comparison. The packet 11 is first transmitted to the receiving unit RX 18 through the transmission unit TX18 of the loop-back port 18, and is then transmitted back to the switch engine 14. It is worth noting that the loop-back port 18 may be a physical connection port, or an internal connection port. In addition, the present invention loop-back port 18 may be a reserved connection port or a connection port in use. However, the loop-back port 18 in the present invention is not limited to such examples.

Similarly, the switch engine 14 first determines whether the packet 11 includes a flow header or not after receiving the packet 11 from the loop-back port 18. Since the switch engine 14 has attached the flow header to the packet 11 in the previous process, the packet 11 includes the flow header and is not identified as a packet received for the first time. Hence, the switch engine 14 selects a corresponding flow table according to the assigned value of the flow ID from the storage module 12 to perform comparison. Likewise, the switch engine 14 also determines whether the packet 11 matches at least one flow entry of the corresponding flow table. If the packet 11 matches at least one of the flow entries, the switch engine 14 processes the packet 11 based on the corresponding instruction(s). If the corresponding instruction includes the specific action of comparing the packet 11 with yet another flow table again, the switch engine 14 modifies the flow header by setting a new assigned value as the flow ID. The packet 11 is transmitted back to the switch engine 14 again through the loop-back port 18 to perform the following packet comparison. Since the subsequent procedure of the comparison is performed by retrieving the flow table corresponding to the flow ID as described above, details of the comparison are not described herein.

In an embodiment, if the corresponding instruction includes a specific action of ending the packet comparison, namely the switch engine 14 determines that the corresponding instruction for the packet 11 does not include the specific action of comparing the packet with another flow table, the corresponding instruction performed by the switch engine 14 at least includes either dropping the packet 11, or transmitting the packet 11 to an external network device 2 or the controller 120 through the output port 16. Not only the match fields of the flow entries, but also the instructions of the flow entries can be regulated and modified by the controller 120 according to the OpenFlow spec. For example, the controller 120 may control the switch engine 14 to edit the packet contents such as modifying the header, and then forward the packet 11. However, the corresponding instruction of the present invention is not limited to such examples. The packet 11 is transmitted to the assigned external network device 2 or the controller 120 through the transmission unit TX16 of the output port 16. In some embodiments, the external network device 2 may be a destination host or the next packet switch device.

In an embodiment, if the packet 11 does not match any of the flow entries of any of the flow tables, which is a mismatch condition, the corresponding instruction performed by the switch engine 14 includes directly comparing the packet 11 with the flow table next to the current flow table. As mentioned above, multiple flow tables are sequentially numbered according to the current OpenFlow specification. Therefore, the flow table next to the current flow table indicates the flow table that is numbered subsequently. In another embodiment, the packet 11 is directly dropped. In yet another embodiment, the switch engine 14 transmits the packet 11 to the controller 120 through the output port 16 such that the controller 120 performs other possible actions. For example, the controller 120 edits the flow table 13 based on related criteria or characteristic of the packet 11. It is worth noting that when the packet 11 does not match any of the flow entries, the selection of the action varies according to the current flow table. Further, if the current flow table is the last one, the packet 11 is not able to be compared with the next flow table.

Since the comparison with the next flow table is implemented by setting the flow ID and transmitting back described above, details are not described again herein.

The number of the flow tables supported by the packet switch device in the present invention is determined by the memory capacity of the ternary content addressable memory.

In another embodiment, when the switch engine 14 receives the packet 11 for the first time and determines that the packet 11 does not include a flow header, the switch engine 14 directly attaches the flow header to the packet 11 first to set a default value to the flow ID in the flow header.

According to the current OpenFlow specification, the flow table numbered 0 is usually set as the default flow table for the packet that does not include a flow header. The default value of the flow ID is thus set to zero in order to retrieve the flow table numbered 0. Hence, in the present embodiment, when the packet 11 is attached with the flow header and the flow ID is set to the default value, then the switch engine 14 retrieves the corresponding flow table from the storage module 12 based on the flow ID and performs a comparison to determine whether the packet 11 matches at least one flow entry of the default flow table. If the switch engine 14 determines that the packet 11 matches at least one of the flow entries and the corresponding action includes the specific action of comparing the packet 11 with another flow table, the switch engine 14 modifies the flow header by setting the flow ID to an assigned value corresponding to another flow table. The packet 11 is then transmitted back to the switch engine 14 through the loop-back port 18 to perform the next packet comparison according to the other flow table.

Figure 2:
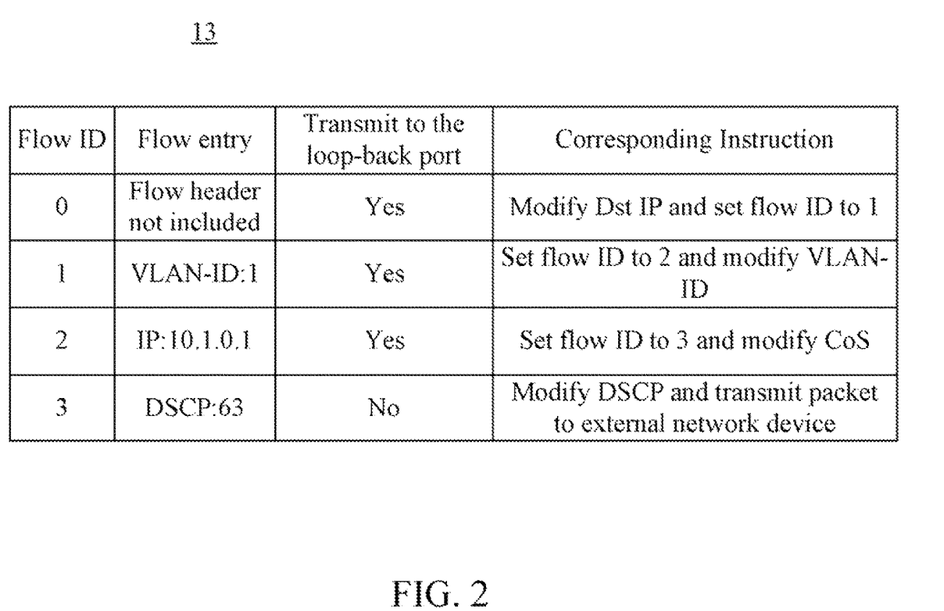
FIG. 2 is a schematic diagram showing a plurality of flow tables according to an embodiment of the invention.

FIG. 2 is a schematic diagram showing a plurality of flow tables 13 according to an embodiment of the invention.

As shown in FIG. 2, the fields in each of the rows of the flow tables 13 record the flow tables that correspond to different flow IDs and the flow entries and instructions contained therein. The field that contains the action, "transmit to the loop-back port", is actually a part of the corresponding instruction and indicates the instruction of whether a comparison of the packet 11 with another flow table is performed. In order to make a clear description, the action mentioned above is depicted as an independent field. In practice, this field may be integrated into the field of the corresponding instruction.

In the present embodiment, the fields in the first row of the plurality of flow tables 13 record the corresponding instruction that includes the action of "modifying the destination IP of the packet 11, and setting the flow ID to the assigned value 1" and the corresponding instruction including the action of "transmitting the packet 11 to the loop-back port to compare the packet 11 with another flow table" when the packet 11 matches the flow entry of "not including a flow header." Hence, if the packet 11 matches the flow entry when the packet 11 does not include a flow header, the switch engine 14 not only modifies the destination IP, but also modifies the flow ID in the flow header of the packet 11 to 1 and transmits the packet 11 to the loop-back port 18.

The fields in the second row of the flow tables 13 record the corresponding instruction including the action of performing a comparison based on the corresponding flow table when the flow ID of the packet 11 is 1. Further, when the 11 matches the flow entry when the virtual local area network ID (VLAN-ID) is 1, the actions included in the corresponding instruction are performed to "modify the virtual local area network ID of the packet 11, set the flow ID to the assigned value 2" and transmit the packet 11 to the loop-back port to compare the packet 11 with another flow table. Hence, if the flow ID of the packet 11 is 1 and the packet 11 matches the flow entry of the corresponding flow table, the switch engine 14 not only modifies the virtual local area network ID, but also modifies the flow ID in the flow header of the packet 11 to 2 and transmits the packet 11 to the loop-back port 18.

The fields in the third row of the plurality of flow tables 13 record the corresponding instruction including the action of performing a comparison based on the corresponding flow table when the flow ID of the packet 11 is 2. If the packet 11 matches the flow entry when the Internet protocol (IP) address is 10.1.0.1 the actions included in the corresponding instruction are performed to "modify the class of service (CoS) of the packet 11, set the flow ID to the assigned value 3" and transmit the packet 11 to the loop-back port to compare the packet 11 with another flow table. Hence, if the current flow ID of the packet 11 is 2 and the packet 11 matches the flow entry of the corresponding flow table, the switch engine 14 not only modifies the class of service, but also modifies the flow ID in the flow header of the packet 11 to 3, and transmits the packet 11 to the loop-back port 18.

The fields in the fourth row of the plurality of flow tables 13 record the corresponding instruction including the action of performing a comparison based on the corresponding flow table when the flow ID of the packet 11 is 3. If the packet 11 matches the flow entry when "the differentiated service code point (DSCP) is 63," the actions included in the corresponding instruction are performed to "modify the differentiated service code point of the packet 11 and transmit the packet 11 to an external network device through a specific output port" Hence, if the current flow ID of the packet 11 is 3 and the packet 11 matches the flow entry of the corresponding flow table, the switch engine 14 modifies the differentiated service code point and transmits the packet 11 through the output port 16 instead of transmitting the packet 11 to the loop-back port 18. It is worth noting that, as mentioned previously, the corresponding instructions may include other specific actions in other embodiments, such as dropping or forwarding the packet, and is not limited to the embodiment of transmitting the packet 11 through the output port 16. In addition, there are corresponding instructions even if all of the flow entries are not matched, which are not described in detail herein.

The flow tables 13 depicted in FIG. 2 are only a simple example for elucidation. However, the flow tables in the present invention are not limited to the examples mentioned above. In different embodiments of the present invention, the flow table may contain different numbers of flow entries and different numbers of instructions. For example, in some embodiments, a specific instruction is not performed unless the packet 11 matches two or more flow entries (such as when the virtual local area network ID is 1 and the Internet protocol address is 10.1.0.1). In some other embodiments, the instruction may be performed to modify two or more kinds of packet contents (such as modifying the class of service and the differentiated service code point at the same time). As mentioned previously, owing to the characteristic of the ternary content addressable memory, not only multiple flow entries can be set, but also different standards of determination including "have," "not have," or "don't care" are also set for each of the flow entry. For the fields corresponding to a specific flow ID, such as the flow ID 1, the number of rows corresponding to the flow ID 1 varies with the number of the corresponding flow entries and corresponds to different instructions. Each of the rows corresponding to the flow ID 1 can be regarded as the flow table corresponding to the flow ID 1, and should not be limited to the description of the above-mentioned embodiments.

In an embodiment, the flow tables 13 are in different levels, in which the number of the levels is increased when the stages of comparison increases. When the switch engine 14 sets or modifies the flow ID to the default value or the assigned value, the set or modified flow ID is always larger than the previous flow ID.

For example, if the default value 0 is assigned as the flow ID when the packet 11 just enters the packet switch device 1, the packet 11 is compared with the flow table numbered 0. If the packet 11 needs to be compared with another flow table, the action sets the flow ID to a value greater than 0 such as 1, 2, or 3, to respectively correspond to the flow table numbered 1, 2, or 3 to perform the subsequent comparison procedures. If the flow ID of the packet 11 is assigned as 1, the packet 11 will first be compared with the flow table numbered 1. Next, if the packet 11 needs to be compared with another flow table, the action will set the flow ID to a value greater than 1, such as 4 or 5, to respectively correspond to the flow table numbered 4 or 5 to perform the subsequent comparison procedures. In this manner, the assigned value will increase with the increasing number of comparisons to allow the packet 11 to be compared with the subsequent flow table. It is worth noting that the assigned value may be increased irregularly instead of regularly, in which the assigned value is increased regularly when the packet is compared with the flow table in a one-by-one manner. The increasing of the assigned value of the flow ID allows the comparison procedures to continually proceed to subsequent flow tables to avoid the occurrence of an infinite loop generated by reverse comparison.

It is worth noting that the structure of the flow tables mentioned above is only for elucidation. In other embodiments, other structures may be used based on different flow entries and different corresponding actions to accomplish the best results.

Figure 3:
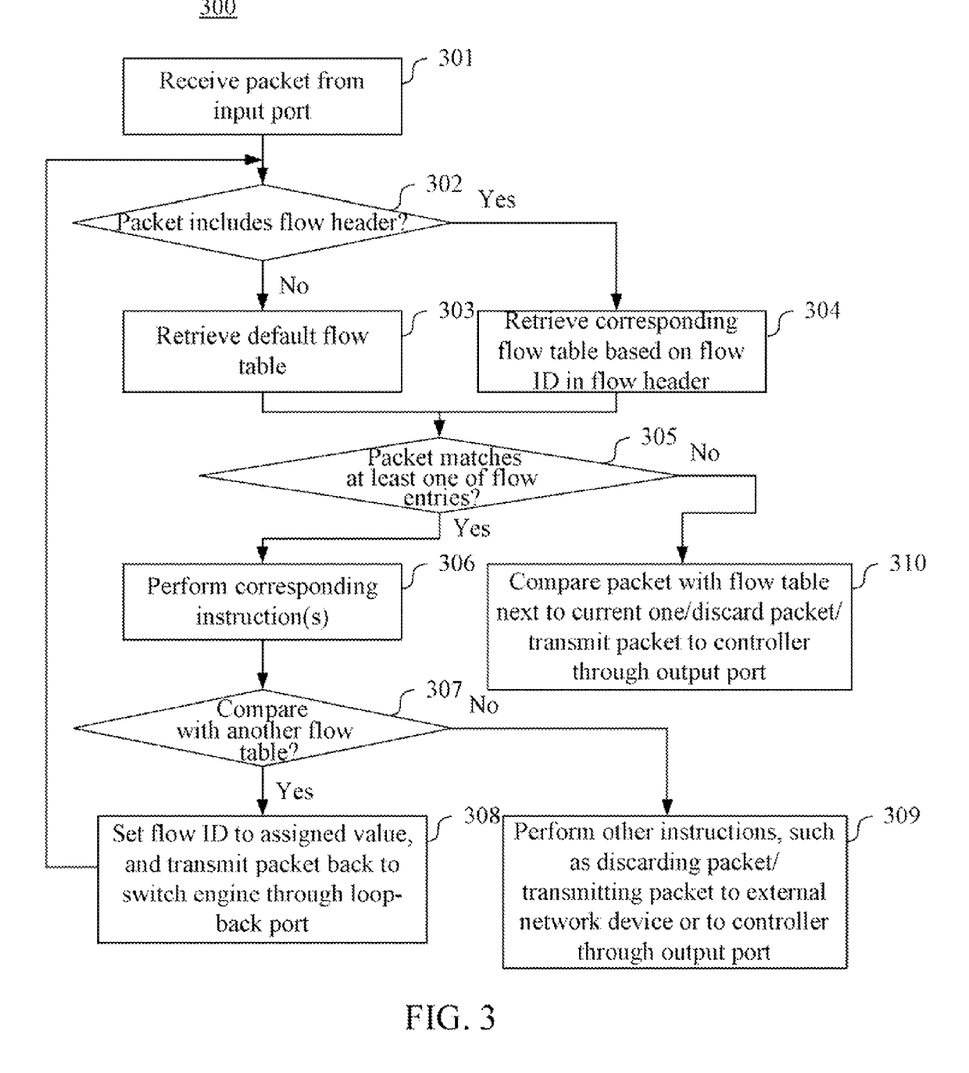
FIG. 3 is a flow chart of a method for packet switching according to an embodiment of the invention.

FIG. 3 is a flow chart of a method 300 for packet switching according to an embodiment of the invention. The method 300 may be applied to the packet switch device 1 shown in FIG. 1. The method 300 includes the steps outlined below.

In step 301, the packet 11 is received from the input port 10. In step 302, the switch engine 14 determines whether the packet 11 includes a flow header.

If the packet 11 does not include a flow header, in step 303, the switch engine 14 retrieves a default flow table. If the packet 11 includes a flow header, in step 304, the switch engine 14 retrieves a corresponding flow table based on a flow ID in the flow header.

After step 303 and step 304 are performed, in step 305, the switch engine 14 determines whether the packet 11 matches at least one flow entries of the default flow table or the corresponding flow table. If the packet 11 matches at least one of the flow entries, in step 306, the switch engine 14 performs a corresponding instruction.

Subsequently, in step 307, the switch engine 14 determines whether the corresponding action includes a specific action of comparing the packet 11 with another flow table. If the action includes the specific action of comparing the packet 11 with another flow table, in step 308, the flow ID in the flow header is set to an assigned value corresponding to the flow table to be compared, and the packet 11 is transmitted back to the switch engine 14 through the loop-back port 18. The flow then returns to step 302 to compare the packet 11 with the corresponding flow table based on the flow ID.

In step 307, if the switch engine 14 determines that the action does not include the specific action of comparing the packet 11 with another flow table, the switch engine 14 determines that the action includes a specific action of ending the comparison with the flow table, and performs other actions in step 309, such as either discarding the packet 11, or transmitting the packet 11 to the external network device 2 or the controller 120 through the output port 16, etc. As mentioned previously, the controller 120 can further set various contents for the action. However, the actions of the present invention are not limited to such an example.

If the switch engine 14 determines that the packet 11 does not match any of the flow entries in step 305, the switch engine 14 directly compares the packet 11 with the flow table next to the flow table being currently compared, discards the packet 11, or transmits the packet 11 to the controller 120 through the output port 16 in step 310. Since this technical aspect has been described previously, a further description in this regard is not provided.

Figure 4:
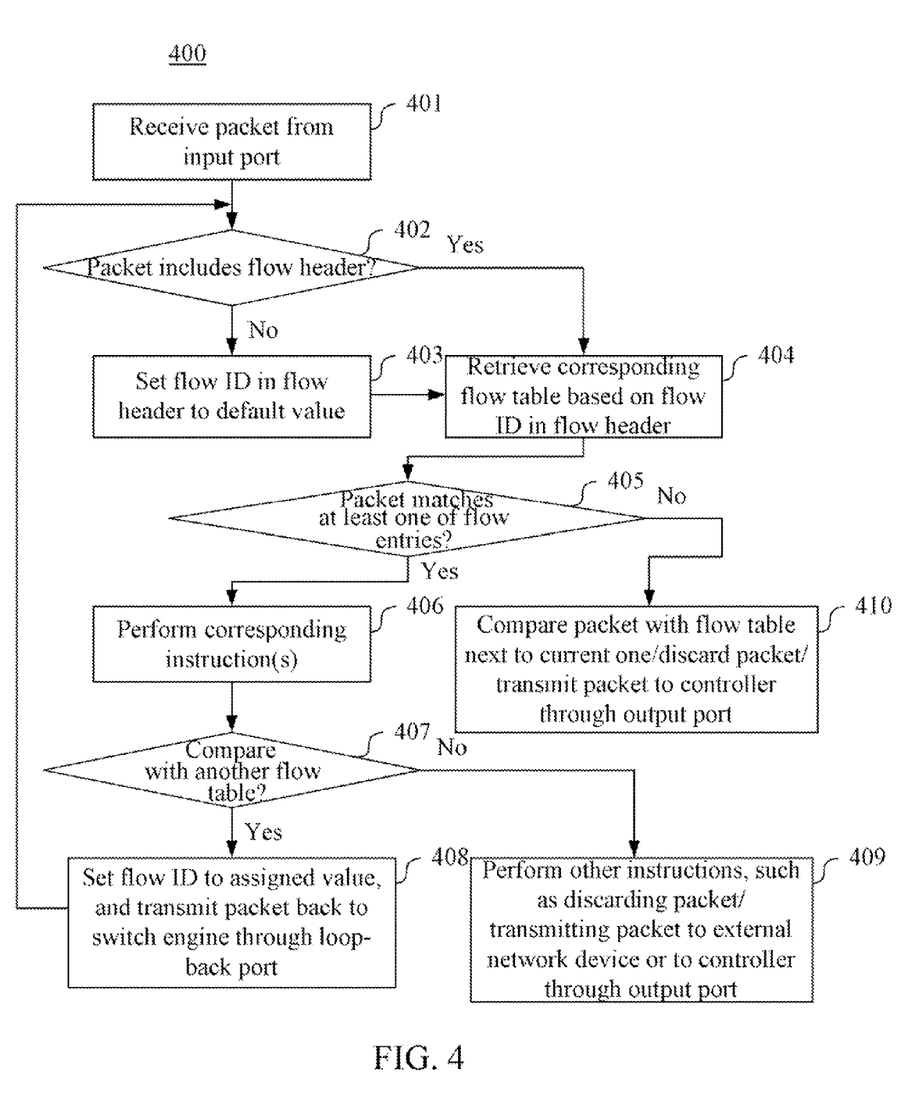
FIG. 4 is a flow chart of a method for packet switching according to another embodiment of the invention.

FIG. 4 is a flow chart of a method 400 for packet switching according to another embodiment of the invention. The method 400 may be applied to the packet switch device 1 shown in FIG. 1. The method 400 in the present embodiment is similar to the method 300 mentioned above. The only difference is that if the packet 11 does not include a flow header, the switch engine 14 sets a flow ID in the flow header to a default value in step 403. After step 403, the switch engine 404 retrieves a corresponding packet flow table based on the flow ID in the flow header in step 404. Since the following steps and other features are the same as those in the method 300 described above with reference to FIG. 3, a further description in this regard is not provided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A packet switch device, comprising:
    an input port to receive a packet;
    a loop-back port;
    a storage module to store a plurality of flow tables, each of the flow tables comprising at least one flow entry and at least one action; and
    a switch engine to determine whether the packet comprises a flow header, the switch engine comparing the packet with a default flow table of the plurality of flow tables when the packet does not comprise a flow header;
    wherein the switch engine compares the packet with the flow entry of the default flow table and performs the corresponding action when the packet matches the flow entry;
    wherein when the switch engine determines the corresponding action comprises comparing the packet with another one of the flow tables, the switch engine according to the corresponding action attaches the flow header to the packet to set a flow ID corresponding to the another one of the flow tables in the flow header and transmits the packet with the flow ID to the loop-back port,
    wherein the packet with the flow ID is transmitted directly back to the switch engine through the loop-back port.

2. The packet switch device of claim 1, wherein if the packet comprises a flow header, the switch engine retrieves a corresponding flow table according to the flow ID in the flow header from the plurality of flow tables to perform a comparison with the packet, compares the packet with the flow entry of the corresponding flow table, and performs the corresponding action when the packet matches the flow entry, wherein when the action comprises the specific action of comparing the packet with another one of the flow tables, the switch engine modifies the flow ID correspondingly and transmits the packet back to the switch engine through the loop-back port, wherein a value of the modified flow ID is greater than a value of the flow ID prior to modification.

3. The packet switch device of claim 1, wherein the storage module is a ternary content addressable memory.

4. The packet switch device of claim 2, further comprising an output port, wherein when the packet does not match the flow entry of the default flow table or the corresponding flow table, the switch engine directly compares the packet with the flow table next to the default flow table or the corresponding flow table, discards the packet, or transmits the packet outward through the output port.

5. The packet switch device of claim 1, wherein the flow entry comprise at least one piece of internal packet information and at least one piece of external packet information, wherein the internal packet information comprises an Internet Protocol (IP) address, a virtual local area network (VLAN) identifier, a class of service (CoS), a differentiated services code point (DSCP), or a combination thereof, wherein the external packet information comprises a packet source, a port number of the input port, or a combination thereof.

6. A method for packet switching applied to a packet switch device, comprising:
    determining whether a packet comprises a flow header by a switch engine, wherein the switch engine compares the packet with a default flow table of a plurality of flow tables if the packet does not comprise the flow header, wherein each of the plurality of flow tables comprises at least one flow entry and at least one action;
    comparing the packet with the flow entry of the default flow table by the switch engine, and performing the corresponding action when the packet matches the flow entry; and
    when the switch engine determines the corresponding action comprises comparing the packet with another one of the flow tables, attaching, according to the corresponding action, the flow header to the packet to set a flow ID corresponding to the another one of the flow tables in the flow header and transmitting the packet with the flow ID to loop-back port, wherein the packet with the flow ID is transmitted directly back to the switch engine through the loop-back port.

7. The method of claim 6, further comprising:
    retrieving a corresponding flow table according to the flow ID in the flow header from the plurality of flow tables to perform a comparison with the packet by the switch engine if the packet comprises the flow header; and
    comparing the packet with the flow entry of the corresponding flow table and performing the corresponding action when the packet matches the flow entry, wherein when the action comprises the specific action of comparing the packet with another one of the flow tables, the switch engine modifies the flow ID correspondingly and transmits the packet back to the switch engine through the loop-back port, wherein a value of the modified flow ID is greater than a value of the flow ID prior to modification.

8. The method of claim 6, wherein the method further comprises updating the plurality of flow tables with a control server.

9. A method for packet switching, comprising:
    determining whether a packet comprises a flow header by a switch engine, the switch engine attaching a flow header to the packet to set a flow ID if the packet does not comprise a flow header;
    retrieving a corresponding flow table according to the flow ID from the plurality of flow tables to perform a comparison with the packet by the switching engine, wherein each of the plurality of flow tables comprises at least one flow entry and at least one action;
    comparing the packet with the flow entry of the corresponding flow table by the switch engine, and performing the corresponding action when the packet matches the flow entry;
    when the switch engine determines the corresponding action comprises comparing the packet with another one of the flow tables, modifying the flow ID corresponding to the another one of the flow tables and transmitting the packet with the modified flow ID to a loop-back port by the switch engine, wherein a value of the modified flow ID is greater than a value of the flow ID prior to modification; and
    transmitting the packet with the modified flow ID back to the switch engine directly by the loop-back port.

10. The method of claim 9, further comprising:
    directly comparing the packet with the flow table next to a default flow table or the corresponding flow table, discarding the packet, or transmitting the packet outward through an output port by the switch engine when the packet does not match the flow entry of the default flow table or the corresponding flow table.

* * * * *